(12) United States Patent
Jiang et al.

(10) Patent No.: US 8,550,446 B2
(45) Date of Patent: Oct. 8, 2013

(54) SCANNING-PRINTING INTEGRATED APPARATUS

(75) Inventors: Tianxin Jiang, Weihai (CN); Xiaojie Tang, Weihai (CN); Shuxun Dong, Weihai (CN); Chuntao Wang, Weihai (CN); Min Yang, Weihai (CN)

(73) Assignee: Shandong New Beiyang Information Technology Co., Ltd, Weihai (CN)

( * ) Notice: Subject to any disclaimer, the term of this patent is extended or adjusted under 35 U.S.C. 154(b) by 60 days.

(21) Appl. No.: 13/638,208

(22) PCT Filed: Nov. 12, 2010

(86) PCT No.: PCT/CN2010/078696
§ 371 (c)(1),
(2), (4) Date: Sep. 28, 2012

(87) PCT Pub. No.: WO2011/120306
PCT Pub. Date: Oct. 6, 2011

(65) Prior Publication Data
US 2013/0015619 A1 Jan. 17, 2013

(30) Foreign Application Priority Data
Apr. 1, 2010 (CN) .......................... 2010 1 0146775

(51) Int. Cl.
*B65H 5/00* (2006.01)
(52) U.S. Cl.
USPC ....................................... 271/3.14; 271/3.18
(58) Field of Classification Search
USPC ....... 271/3.14, 3.18, 264, 272, 314; 358/496, 358/498
See application file for complete search history.

(56) References Cited

U.S. PATENT DOCUMENTS 5,794,927 A * 8/1998 Uchida ........................ 271/3.18
7,857,535 B2 * 12/2010 Takeda et al. ................. 400/636
(Continued)

FOREIGN PATENT DOCUMENTS

| CN | 2541416 Y | 3/2003 |
| CN | 1604143 A | 4/2005 |

(Continued)

OTHER PUBLICATIONS

International Search Report for corresponding Application No. PCT/CN2010/078696, dated Feb. 17, 2011 (11 pgs.).

(Continued)

*Primary Examiner* — David H Bollinger
(74) *Attorney, Agent, or Firm* — Shumaker & Sieffert, P.A.

(57) ABSTRACT

A scanning-printing integrated apparatus comprises a scanning passage (1), a printing passage (3) communicated with the scanning passage (1), a transitional passage (2) providing printing medium to the printing passage (3), a first driving mechanism for driving the paper conveying roller (12) of the scanning passage (1) and the paper conveying roller (312) of the printing passage (3), and a second driving mechanism for driving the paper conveying roller (21) of the transitional passage (2) and the paper conveying roller (312) of the printing passage (3). The two ends of the paper conveying roller (312) of the printing passage (3) are respectively transmission-connected to the first driving mechanism and the second driving mechanism via one-way bearings (71, 72). By providing one-way bearings at the two ends of the paper conveying roller of the printing passage, the first driving mechanism and the second driving mechanism work independently without interfering with each other, so that the two driving mechanisms drive the manuscript or printing paper to be freely conveyed in the scanning passage, the printing passage and the transitional passage without increasing loads.

10 Claims, 4 Drawing Sheets

(56) References Cited

U.S. PATENT DOCUMENTS

2007/0243003 A1 10/2007 Kinoshita et al.
2010/0230889 A1* 9/2010 Eoka et al. .................. 271/3.14
2012/0187618 A1* 7/2012 Edwards et al. ............ 271/3.14
2013/0015619 A1* 1/2013 Jiang et al. .................. 271/3.14

FOREIGN PATENT DOCUMENTS

| | | | |
|---|---|---|---|
| CN | 2692712 Y | 4/2005 | |
| CN | 101662554 A | 3/2010 | |
| CN | 101830124 A | 9/2010 | |
| WO | 2008078125 A1 | 7/2008 | |

OTHER PUBLICATIONS

Written Opinion of the International Search Authority for corresponding Application No. PCT/CN2010/078696, dated Feb. 17, 2011 (10 pgs.).

* cited by examiner

SCANNING-PRINTING INTEGRATED APPARATUS

The application claims for the priority of Chinese patent with application No. 201010146775.1, titled as "Scanning-printing Integrated Apparatus", and submitted on Apr. 1, 2010, and all disclosed contents thereof should be incorporated herein by reference.

TECHNICAL FIELD OF THE INVENTION

The present invention relates to a scanning-printing integrated apparatus, in particular to an improvement to a medium driving mechanism in the scanning-printing integrated apparatus.

BACKGROUND OF THE INVENTION

Scanning-printing integrated apparatus usually includes two main parts: one is a scanning device, and the other is a printing device.

According to different structures, there are usually three types of scanning-printing integrated apparatuses: the first type of scanning-printing integrated apparatus is an apparatus whose scanning passage is not directly communicated with the printing passage, and the typical example is a duplicator; the second type of scanning-printing integrated apparatus is an apparatus whose scanning passage is communicated with the printing passage, and the typical example is an invalidated ticket processing apparatus; the third type of scanning-printing integrated apparatus is an apparatus whose scanning passage and the transitional passage for providing the printing medium meet at the paper feed end of the printing passage, and the typical example is a lottery ticket printing-cashing integrated machine.

By taking a duplicator for example, the working process of the first type of scanning-printing integrated apparatus is as follows: when the duplicator works, the manuscript is input into the scanning passage, information of the manuscript is acquired by the scanning device, then the printing medium is input into the printing passage, and the acquired information of the manuscript is printed on the printing medium by the printing device. Such scanning-printing integrated apparatus needs two independent medium driving mechanisms to respectively convey medium into the scanning passage and medium into the printing passage.

By taking an invalidated ticket processing apparatus for example, the working process of the second type of scanning-printing integrated apparatus is as follows: the invalidated ticket processing apparatus is typically applied in the field of lottery sales; of course, it may also be applied in other fields such as traffic ticket, entrance ticket even currency and securities. When the invalidated ticket processing apparatus in the field of lottery ticket works, firstly, the lottery ticket (that is, the manuscript) is input into the scanning passage, and the information of the lottery ticket is acquired by the scanning device, and then the lottery ticket is controlled to enter the printing passage from the scanning passage, and an invalidated mark is printed on the lottery ticket by the printing device. As the scanning passage is communicated with the printing passage, such scanning-printing integrated apparatus needs only one medium driving mechanism to convey medium to move freely in the scanning passage and the printing passage.

By taking an lottery ticket printing-cashing integrated machine for example, the working process of the third type of scanning-printing integrated apparatus is as follows: during the operation of cashing of the lottery ticket printing-cashing integrated machine, firstly, the lottery ticket is input into the scanning passage and information of the lottery ticket is acquired by the scanning device, and then the lottery ticket enters the printing passage from the scanning passage and an invalidated mark is printed on the lottery ticket by the printing device, and then the lottery ticket is discharged from the paper outlet. When the lottery ticket printing-cashing integrated machine executes printing operation, the printing medium is conveyed to the printing passage from the paper containing device via the transitional passage. After information is printed on the printing medium by the printing device, the printed medium is discharged from the paper outlet, and the medium not printed in the printing passage returns to the transitional passage.

In order to discharge both the manuscript and the printing medium from the paper outlet via the printing passage, one solution is as follows: three medium driving mechanisms are set to respectively control the manuscript and the printing medium to move in the scanning passage, the transitional passage and the printing passage, and the defect of this solution is that it is necessary to set three driving motors, the structure is complex, and the cost is high. Another solution is as follows: two medium driving mechanisms are set, one of the medium driving mechanisms can simultaneously drive the manuscript to move in the scanning passage and the printing passage, and the other medium driving mechanism can simultaneously drive the printing medium to move in the transitional passage and the printing passage. Although only two driving motors are needed to be set in the solution, when any one of the driving mechanisms works, it will cause the transmission gears and driving motors of the other medium driving mechanism to move passively, the conveying loads of the scanning-printing integrated apparatus are increased greatly, which will easily cause failure in conveying.

SUMMARY OF THE INVENTION

The purpose of the present invention is to provide a scanning-printing integrated apparatus with improvement to a medium driving mechanism.

Therefore, the present invention provides a scanning-printing integrated apparatus, comprising: a scanning passage, a printing passage communicated with the scanning passage, a transitional passage providing printing medium to the printing passage, a first driving mechanism for driving a paper conveying roller of the scanning passage and a paper conveying roller of the printing passage, and a second driving mechanism for driving a paper conveying roller of the transitional passage and the paper conveying roller of the printing passage, wherein two ends of the paper conveying roller of the printing passage are respectively transmission-connected to the first driving mechanism and the second driving mechanism via one-way bearings.

Further, the scanning passage has a scanning device inside, the scanning device comprises a paper compacting element and an optical device for acquiring medium image, which are oppositely arranged at two sides of the scanning passage, and the printing passage has a printing device for printing images or characters on the printing paper.

Further, the printing device comprises a thermal print head and a printing roller that is tangent to the thermal print head for fitting and serves as the paper conveying roller of the printing passage.

Further, the first driving mechanism comprises a first driving motor and a plurality of gears in transmission connection with the first driving motor, and the one-way bearing is arranged between one of the gears and the paper conveying roller of the printing passage.

Further, the second driving mechanism comprises a second driving motor and a plurality of gears in transmission connection with the second driving motor, wherein the one-way bearing is arranged between one of the gears and the paper conveying roller of the printing passage.

Still further, the outer ring of the one-way bearing is provided with a stop rib, and the inner ring of the gear is correspondingly provided with a groove fitting the stop rib. Or, the outer ring of the one-way bearing is provided with a stop groove, and the inner ring of the gear is correspondingly provided with a convex fitting the stop groove. Or, the inner ring of the gear and the outer ring of the one-way bearing are fixed by means of welding or riveting.

Further, the paper feed end of the scanning passage and the paper discharge end of the printing passage are at the same side of the scanning-printing integrated apparatus, and the paper discharge end of the scanning passage and the paper discharge end of the transitional passage are communicated to the paper feed end of the printing passage.

In the present invention, by providing one-way bearings at the two ends of the paper conveying roller of the printing passage, the first driving mechanism and the second driving mechanism work independently without interfering with each other, so that the two driving mechanisms drive the manuscript or printing paper to be freely conveyed in the scanning passage, the printing passage and the transitional passage without increasing loads.

Besides purposes, features and advantages described above, the present invention also has other purposes, features and advantages. Other purposes, features and advantages of the present invention will be further described in details below as shown in drawings.

BRIEF DESCRIPTION OF THE DRAWINGS

Drawings, which form a part of the description and are provided for further understanding of the present invention, show the preferred embodiments of the present invention, and explain the principle of the present invention together with the description. In the drawings.

DETAILED DESCRIPTION OF THE INVENTION

Figure 1:
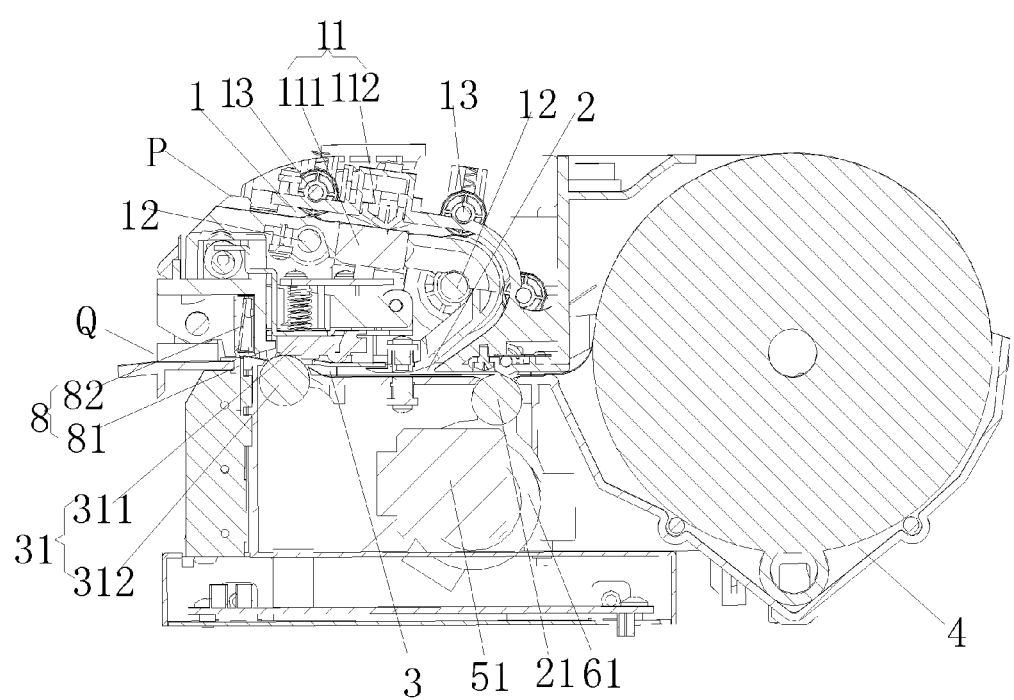
FIG. 1 is a longitudinal profile diagram of a scanning-printing integrated apparatus according to the present invention.

The embodiments of the present invention will be described in detail below as shown in drawings, however the present invention may be implemented by various different ways defined and covered by the claims. In the drawings, identical components are indicated by identical reference number.

FIG. 1 is a longitudinal profile diagram of a scanning-printing integrated apparatus according to the present invention. As shown in FIG. 1, the scanning-printing integrated apparatus comprises a scanning passage 1, a transitional passage 2, a printing passage 3 and a paper containing mechanism 4. The paper feed end of the scanning passage 1 is open to form an inlet P used for inserting a manuscript.

The scanning passage 1 is internally provided with a scanning device 11 for acquiring medium image, the scanning device 11 comprises an optical device 111 and a paper compacting element 112 that are oppositely arranged at the two sides of the passage, the manuscript passes between the optical device 111 and the paper compacting element 112, and the optical device 111 can capture the image of the medium surface. Usually, the optical device 111 may be a contact image sensor CIS and it also may be an electric coupling image sensor CCD. The scanning passage 1 is also internally provided with at least one paper conveying roller 12 for conveying the manuscript. In the embodiment, according to the length and shape of the passage, two paper conveying rollers 12 are provided and are respectively tangent to driven rollers 13 for fitting, the manuscript passes between the paper conveying rollers 12 and the driven rollers 13, and each paper conveying roller 12 rotates to drive the manuscript to move.

The paper feed end of the transitional passage 2 is connected with the paper containing mechanism 4, and printing paper for printing is stored in the paper containing mechanism 4. The transitional passage 2 is internally provided with at least one paper conveying rollers 21 for conveying the printing paper. Similarly, the arrangement position and the number of the paper conveying rollers 21 can be determined according to the length and shape of the passage.

In the embodiment, one paper conveying roller 21 is provided and tangent to the driven roller (not shown) for fitting, the printing paper passes between the paper conveying roller 21 and the driven roller, and the paper conveying roller 21 rotates to drive the printing paper to move.

The paper feed end of the printing passage 3 meets the paper discharge end of the scanning passage 1 and the paper discharge end of the transitional passage 2, the paper discharge end of the printing passage 3 is open to form an outlet Q used for discharging the manuscript or printing paper.

The printing passage 3 is internally provided with a printing device 31 used for printing images or characters on the printing paper. The printing passage 3 is at least internally provided with one paper conveying roller for conveying the printing paper. In the embodiment, the printing device 31 comprises a thermal print head 311 and a printing roller 312 that are oppositely arranged at the two sides of the passage. As the printing rubber roller 312 can be used for conveying the printing paper, in the embodiment, the printing rubber roller 312 also serves as the paper conveying roller.

In other embodiments of the present invention, if the printing device is a dot-matrix, inkjet or laser printing device, it is necessary to separately set a paper conveying roller for conveying the printing paper.

Figure 2:
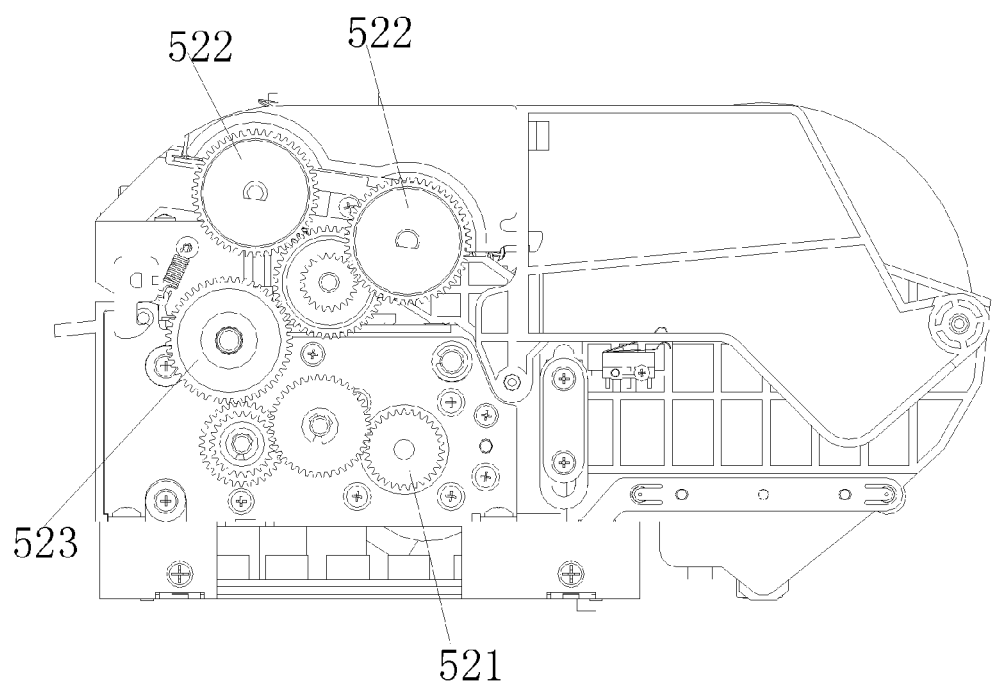
FIG. 2 is a diagram of a first driving mechanism in a scanning-printing integrated apparatus according to the present invention.
Figure 3:
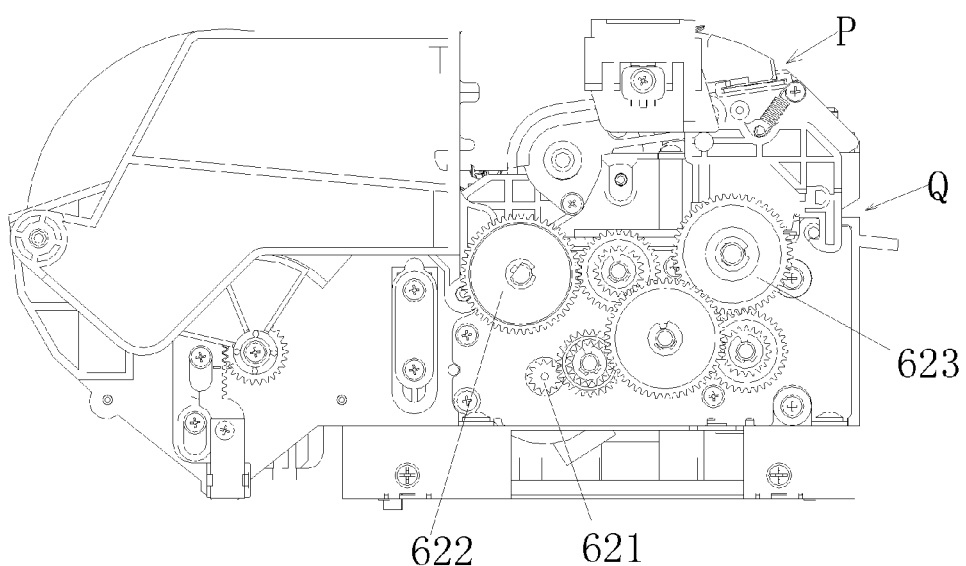
FIG. 3 is a diagram of a second driving mechanism in a scanning-printing integrated apparatus according to the present invention.

With reference to FIG. 2 and FIG. 3, the scanning-printing integrated apparatus further comprises a first driving mechanism, a second driving mechanism and a one-way bearing set.

As shown in FIG. 2, the first driving mechanism comprises a driving motor 51 and a plurality of transmission gears (i.e., a gear set). The gear set comprises a motor gear 521, a gear 522 for the paper conveying roller in the scanning passage, a gear 523 for the paper conveying roller in the printing passage, and a plurality of transition gears.

Figure 4:
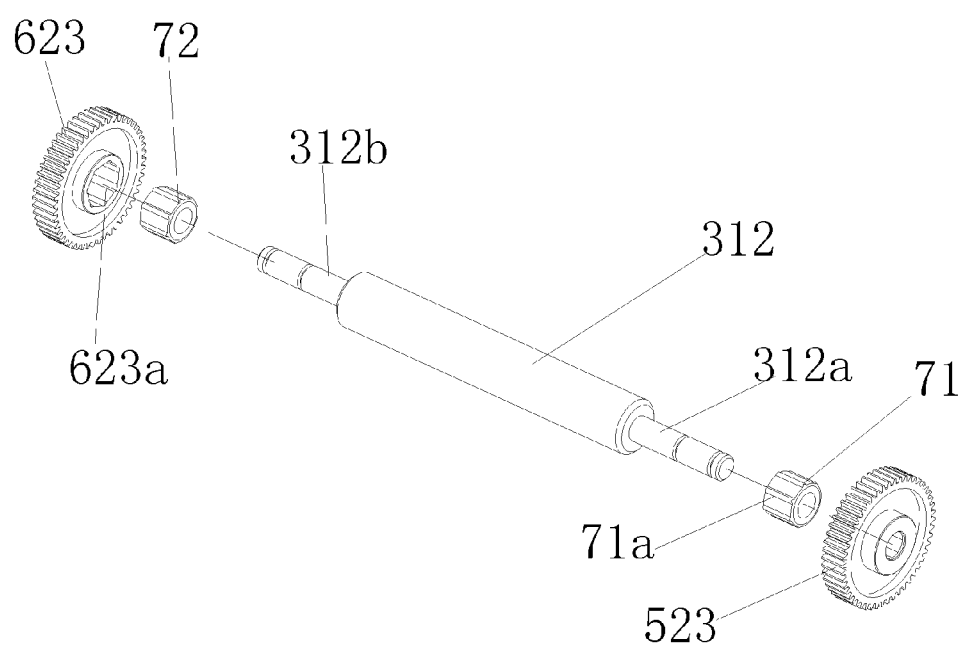
FIG. 4 is a diagram of an assembling relation between a paper conveying roller of a printing passage and a one-way bearing subassembly in a scanning-printing integrated apparatus according to the present invention.

Wherein, the motor gear 521 is fixedly connected with the driving shaft of the driving motor, the gear 522 for the paper conveying roller in the scanning passage is fixedly connected with one shaft end of the paper conveying roller 12 in the scanning passage, and the gear 523 for the paper conveying roller in the printing passage is fixedly connected with the first shaft end of the paper conveying roller in the printing passage. In the embodiment, as the printing rubber roller 312 serves as the paper conveying roller, the gear 523 for the paper conveying roller in the printing passage is fixedly connected with the first shaft end 312a of the printing rubber roller 312 (as shown in FIG. 4).

The plurality of transition gears are respectively engaged with the motor gear 521, the gear 522 for the paper conveying roller in the scanning passage and the gear 523 for the paper conveying roller in the printing passage, to transfer power provided by the driving motor to the paper conveying roller 12 in the scanning passage and the printing rubber roller 312 in the printing passage, in order to drive the manuscript to move in the same direction in the scanning passage 1 and the printing passage 3.

As shown in FIG. 3, the second driving mechanism also comprises a driving motor and a plurality of transmission gears (i.e., a gear set). The gear set comprises a motor gear 621, a gear 622 for the paper conveying roller in the transitional passage, a gear 623 for the paper conveying roller in the printing passage, and a plurality of transition gears.

Wherein, the motor gear 621 is fixedly connected with the driving shaft of the driving motor 61, the gear 622 for the paper conveying roller I is fixedly connected with one shaft end of the paper conveying roller 21, and the gear 623 for the paper conveying roller in the printing passage is fixedly connected with the second end of the paper conveying roller. In the embodiment, the gear 623 is fixedly connected with the second shaft end 312b of the printing rubber roller 312.

The plurality of transition gears are respectively engaged with the motor gear 621, the gear 622 for the paper conveying roller and the gear 623 for the paper conveying roller in the printing passage, transferring power provided by the driving motor to the paper conveying roller 12 in the transitional passage and the printing rubber roller 312, and drive the printing paper to move in the same direction in the transitional passage 2 and the printing passage 3.

With reference to FIG. 4, the one-way bearing set comprises a first one-way bearing 71 and a second one-way bearing 72.

The first one-way bearing 71 is located between the gear 523 and the first shaft end 312a of the printing rubber roller 312, the stop rib or ridge 71a on the outer ring of the first one-way bearing is correspondingly clamped with the groove on the inner ring of the gear 523, so that the first one-way bearing 71 and the gear 523 can move synchronously, and the inner ring of the first one-way bearing is sleeved with the first shaft end 312a.

The second one-way bearing 72 is located between the gear 623 and the second shaft end 312b of the printing rubber roller 312, the stop rib or ridge on the outer ring of the second one-way bearing is correspondingly clamped with the groove on the inner ring 623a of the gear 623, so that the second one-way bearing 72 and the gear 623 can move synchronously, and the inner ring of the second one-way bearing is sleeved with the second shaft end 312b.

It is assumed that conveying the manuscript or printing paper to the paper outlet from the paper feed end of each passage is called paper feeding, the reverse motion is called paper returning. After the first one-way bearing 71 and the second one-way bearing 72 are mounted at the shaft end of the printing rubber roller, the forward rotation of the two bearings can drive the printing rubber roller to feed paper.

When the first driving mechanism drives the manuscript to enter the printing passage 3 from the scanning passage 1, the first gear 523 drives the first one-way bearing 71 to rotate forwardly, therefore, the first one-way bearing 71 tightly holds the first shaft end 312a, so as to drive the printing rubber roller 312 to convey the manuscript to the outlet Q; as the gear 623 and the second one-way bearing 72 are free of external force at this time, the second shaft end 312b can rotate freely in the second one-way bearing 72. Therefore, the second driving mechanism will not be caused to move when the printing rubber roller 312 moves under the drive of the first driving mechanism.

When the second driving mechanism drives the printing paper to enter the printing passage 3 from the transitional passage 2, the gear 623 drives the second one-way bearing 72 to rotate forwardly, therefore, the second one-way bearing 72 tightly holds the shaft end 312b, so as to drive the printing rubber roller 312 to convey the printing paper to the outlet Q. Similarly, the first driving mechanism will not be caused to move when the printing rubber roller 312 moves under the drive of the second driving mechanism.

When the second driving mechanism drives the printing paper to return to the transitional passage 2 from the printing passage 3, the gear 623 drives the second one-way bearing 62 to rotate reversely, therefore, the second one-wary bearing 72 separates from the shaft end 312b of the printing rubber roller 312, the printing rubber roller 312 will not move, so that the first driving mechanism will not be caused to move.

To separate the printed printing paper from the printing paper to be printed conveniently, in the embodiment, a paper cutting device 8 is also arranged between the printing device 31 and the paper outlet Q. The paper cutting device 8 may be an automatic paper cutter including a movable blade 81 and a fixed blade 82, which that are arranged oppositely and respectively located at the two sides of the printing passage 3. The printed printing paper is conveyed to the paper outlet Q via the automatic paper cutter, after printing is completed, the control device controls the automatic paper cutter to act to cut the printed printing paper, so that the user can take the paper away conveniently.

In the present invention, by providing one-way bearings at the two ends of the paper conveying roller of the printing passage, the first driving mechanism and the second driving mechanism work independently without interfering with each other, so that the two driving mechanisms drive the manuscript or printing paper to be freely conveyed in the scanning passage, the printing passage and the transitional passage without increasing loads.

Above contents only describe the preferred embodiments of the present invention and are not intended to limit the present invention; for one skilled in the art, the present invention may have various modifications and changes. Any modifications, equivalent replacements and improvements made within the spirit and principle of the present invention should be included within the protection scope of the present invention.

The invention claimed is:

1. A scanning-printing integrated apparatus, comprising: a scanning passage, a printing passage communicated with the scanning passage, a transitional passage providing printing medium to the printing passage, a first driving mechanism for driving a paper conveying roller of the scanning passage and a paper conveying roller of the printing passage, and a second driving mechanism for driving a paper conveying roller of the transitional passage and the paper conveying roller of the printing passage, wherein, two ends of the paper conveying roller of the printing passage are respectively transmission-connected to the first driving mechanism and the second driving mechanism via one-way bearings.

2. The scanning-printing integrated apparatus according to claim 1, wherein,
the scanning passage has a scanning device inside, the scanning device comprises a paper compacting element and an optical device for acquiring medium image, which are oppositely arranged at two sides of the scanning passage,
the printing passage has a printing device for printing images or characters on the printing paper.

3. The scanning-printing integrated apparatus according to claim 2, wherein the printing device comprises a thermal print head and a printing roller that is tangent to the thermal print head for fitting and serves as the paper conveying roller of the printing passage.

4. The scanning-printing integrated apparatus according to claim 1, wherein the first driving mechanism comprises a first driving motor and a plurality of gears in transmission connection with the first driving motor, and the one-way bearing is arranged between one of the gears and the paper conveying roller of the printing passage.

5. The scanning-printing integrated apparatus according to claim 4, wherein the outer ring of the one-way bearing is provided with a stop rib, and the inner ring of the gear is correspondingly provided with a groove fitting the stop rib.

6. The scanning-printing integrated apparatus according to claim 4, wherein the outer ring of the one-way bearing is provided with a stop groove, and the inner ring of the gear is correspondingly provided with a convex fitting the stop groove.

7. The scanning-printing integrated apparatus according to claim 1, wherein the second driving mechanism comprises a second driving motor and a plurality of gears in transmission connection with the second driving motor, wherein the one-way bearing is arranged between one of the gears and the paper conveying roller of the printing passage.

8. The scanning-printing integrated apparatus according to claim 7, wherein the outer ring of the one-way bearing is provided with a stop rib, and the inner ring of the gear is correspondingly provided with a groove fitting the stop rib.

9. The scanning-printing integrated apparatus according to claim 7, wherein the outer ring of the one-way bearing is provided with a stop groove, and the inner ring of the gear is correspondingly provided with a convex fitting the stop groove.

10. The scanning-printing integrated apparatus according to claim 1, wherein the paper feed end of the scanning passage and the paper discharge end of the printing passage are at the same side of the scanning-printing integrated apparatus, and the paper discharge end of the scanning passage and the paper discharge end of the transitional passage are communicated to the paper feed end of the printing passage.

* * * * *